Dec. 9, 1958     C. L. NEWTON     2,863,296
HIGH PRESSURE CYCLE FOR THE CONTINUOUS SEPARATION
OF A GAS MIXTURE INTO ITS COMPONENTS
Filed July 19, 1955
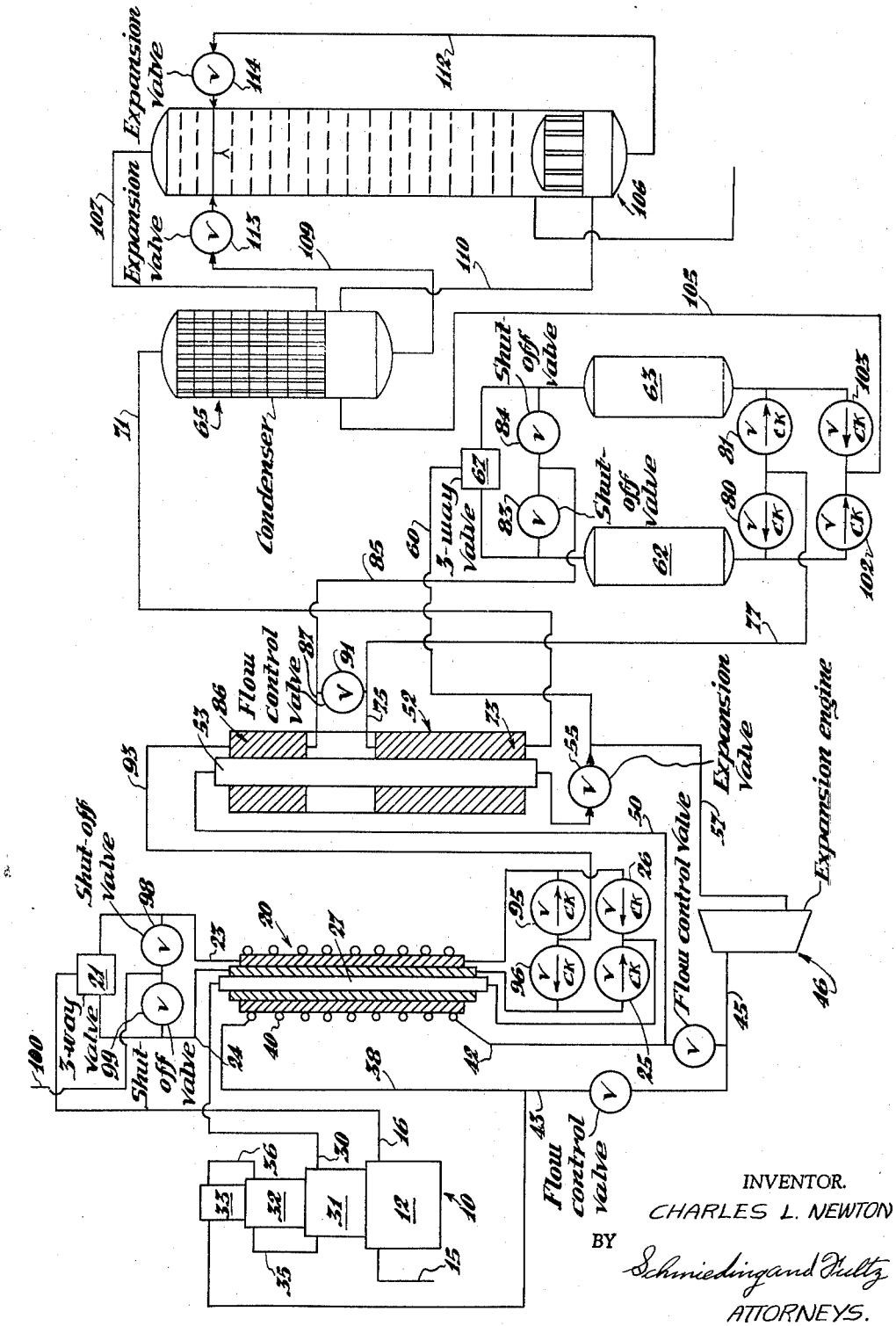
INVENTOR.
CHARLES L. NEWTON
BY
*Schmieding and Fultz*
ATTORNEYS.

United States Patent Office 2,863,296
Patented Dec. 9, 1958

2,863,296

HIGH PRESSURE CYCLE FOR THE CONTINUOUS SEPARATION OF A GAS MIXTURE INTO ITS COMPONENTS

Charles L. Newton, Columbus, Ohio, assignor to Herrick L. Johnston, Inc., Columbus, Ohio, a corporation of Ohio Application July 19, 1955, Serial No. 522,925

13 Claims. (Cl. 62—14)

This invention relates to the separation of gas mixtures and more particularly to a process for continuously effecting such separation and for more efficiently eliminating higher boiling point impurities from the gas mixtures.

In the separation of gas mixtures, such as air, reversing heat exchangers have been employed to remove the undesirable higher boiling impurities such as water vapor and carbon dioxide. A major problem resulting from the use of such reversing exchangers results from the fact that such higher boiling impurities precipitate from the gas mixture, accumulate in the paths of the exchangers, and must therefore be efficiently removed from the paths in order to provide an efficient system. The deposits of higher boiling impurities are removed from the paths of the exchanger by periodically alternating the flow of warm incoming gas mixture and backward returning cold product in any given path through the exchanger. The reversal of flow is effected before the accumulation of higher boiling impurities has become great enough to plug the paths of the exchanger.

In systems of this type, separation units or filters have also been employed for filtering impurities from the gas mixture as a step in the process. A disadvantage in such separation units has resulted from the requirement for purging same from an external purging system with resultant loss of refrigeration to the atmosphere.

It is an object of the present invention to provide a method wherein a novel high pressure cycle is employed utilizing a reversing heat exchanger which is free of plugging hazards.

It is another object of the present invention to provide a method wherein a novel high pressure cycle serves to remove substantially all of the water from a gas mixture such as air in the course of passing such mixture through a single heat exchange zone.

It is another object of the present invention to provide a novel method wherein a single heat exchange zone is utilized to remove substantially all the water from a gas mixture, warm the dried mixture for compression, and to also cool the dried compressed mixture for expansion.

It is another object of the present invention to provide a method for filtering impurities from a gas mixture in a novel and efficient manner without the necessity of an external purging system.

It is another object of the present invention to provide a method for filtering impurities from a gas mixture which effects automatic purging of the filter system without loss of refrigeration from the filter system to the atmosphere.

Further objects and advantages of the present invention will be apparent from the following description, reference being had to the accompanying drawings wherein a preferred form of embodiment of the invention is clearly shown.

In the drawing:

The drawing consists of a schematic illustration of a system for continuously separating a gas mixture into its components, with such system being constructed according to the present invention.

With reference to the drawing, the system includes a compressor means indicated generally at 10 which comprises a plurality of stages including a low pressure stage 12. The incoming gas mixture, such as atmospheric air, enters low pressure stage 12 of the compressor means through a line 15 and the air is compressed to an intermediate pressure such as 200 pounds per square inch absolute. The compressed air passes from the low pressure stage 12 through a line 16 to a warm reversing heat exchanger indicated generally at 20. A 3-way reversing valve 21 is provided to alternately connect line 16, from the low pressure stage 12 of the compressor, to each of two paths 23 and 24 through reversing exchanger 20. When the compressed incoming gas mixture is passed through one path, such as 23, of the heat exchanger, a backward returning product of separation, such as nitrogen, is passed through the other path 24 in counter current heat exchange with the incoming gas mixture. In passing through the path 23, the gas mixture is cooled to some appropriate temperature for the system, such as 70° F., whereby the gas mixture deposits substantially all of its water content in said path. At the same time, the counter current nitrogen flow, through path 24 of the exchanger, not only cools the incoming gas mixture flowing through path 23, but also performs the function of removing the water deposited in path 24 by the incoming gas mixture directed through such path prior to reversal of heat exchanger 20.

The cooled gas mixture leaving path 23 passes through a check valve 26 and then enters another path 27 of the exchanger and flows from the cold to the warm end to warm the gas mixture prior to compression.

The gas mixture from path 27 leaves the warm end of exchanger 20 and passes through line 30 leading to the last three stages of the compressor 10, which stages are indicated at 31, 32 and 33. It will be noted that these stages are connected by lines 35 and 36 and provided with an exit line 38 which leads from the final stage 33 of the compressor to still another path 40 through heat exchanger 20. In passing through path 40 the gas mixture is cooled by counter current heat exchange with the nitrogen waste product flowing through one of the paths 23 or 24 of the exchanger. The gas mixture leaving the cold end of path 40 through a line 42 is then combined with the remaining portion of the gas mixture leaving the compressor passing through a line 43.

In passing through the three final stages 31, 32, and 33 of the compressor, the gas mixture is compressed to some appropriate high pressure for the system such as 3000 pounds per square inch absolute. The portion of the compressed gas mixture passing through line 43, being warmer than the other portion of the compressed gas mixture passing through line 42, is combined with such other portion to warm same. Such combined portions form a stream flowing in line 45 which is at an appropriate temperature for presentation to an expansion engine 46. In expansion engine 46 the pressure of the gas mixture is dropped to an appropriate low pressure for the system, such as 100 pounds per square inch absolute, and the temperature is lowered close to the saturation temperature of minus 275° F.

The remaining portion of the relatively cold gas mixture from the cold end of path 40 of reversing exchanger 20 is passed through a line 50 which leads to the warm end of a cold exchanger indicated generally at 52. The gas mixture is further cooled in passing along a path 53 in the cold exchanger 52, and, after leaving the cold end of path 53, the cold gas mixture is then expanded through an expansion valve 55 to an appropriate relatively low pressure, such as 100 pounds per square inch absolute, with the temperature of such expanded gas mixture being close to the saturation temperature of minus 275° F. The portion of the expanded gas mixture leaving the expansion valve 55 is then united with the other portion of the expanded gas mixture passing from the expansion engine through the line 57.

The portion of the gas mixture from the expansion valve 55 and the other portion of the gas mixture from the expansion engine 46 then pass through a line 60 to one of two filter units 62 or 63 wherein solid impurities, such as carbon dioxide, are filtered from the air prior to presentation of the mixture to a condenser indicated generally at 65.

A three-way reversing valve 67 serves to alternately connect line 60 with each of the filter units 62 and 63 for alternately passing the cold expanded gas mixture through such filter units.

When incoming gas mixture is flowing through one of the filter units 62, a returning product of separation such as nitrogen is passed through the other of the filter units 63 in the opposite direction of flow for the purpose of removing the solid carbon dioxide content deposited by the incoming gas mixture in flowing through filter unit 63 prior to reversal. Nitrogen for the filter units 62 and 63 is obtained from the top of the condenser 65. A line 71 leads from the top of the condenser to the cold end of cold reversing exchanger 52 where it enters a path 73 which extends an appropriate distance through the exchanger to a location 75. The nitrogen from condenser 65 is passed along path 73 to location 75, at which location the nitrogen will have been warmed to an appropriate temperature required for the nitrogen at the filter. The nitrogen leaves path 73 through a line 77 which is connected with one of the filter units 62 or 63 by means of a check valve 80 or 81. If gas mixture is passing through filter unit 62, then warmed nitrogen from path 73 is passed through the other filter unit 63 for purging same. In passing through the filter unit 63 the nitrogen vaporizes and removes the deposited carbon dioxide from such filter unit. The nitrogen then leaves the upper end of filter unit 63 through the valve 84, and then passes through a line 85 to a warm path 86 of the cold exchanger 52. The nitrogen leaving the filter units 62 or 63 is introduced into path 86 at an appropriate location 87 for the system.

In view of the foregoing, it will be understood that reversing filters 62 and 63 can be efficiently and automatically operated and purged of solid impurities deposited by the gas mixture without loss of refrigeration from the system. Specifically, this result is accomplished in the following manner. The high pressure gas mixture from line 60 in passing through one of the filter units 62 will cool such filter unit. After the gas mixture ceases to flow in such filter unit, warmed nitrogen from path 73 passes through the filter unit 62 in which the nitrogen is vaporized in removing the deposits of carbon dioxide. In passing the nitrogen through the filter unit 62, the filter unit will give up refrigeration to the nitrogen. The refrigeration, given up by the filter unit to the nitrogen, is then returned to the high pressure gas mixture flowing through path 53 in cold exchanger 52, since the nitrogen is passed in heat exchange relationship with the gas mixture along the path 86. Hence it is seen that the refrigeration, lost by the filters to the nitrogen is given up to the high pressure gas mixture which in turn returns such refrigeration to the filter units.

A valve flow control 91 provides a by-pass for nitrogen from path 73 to path 85 whereby the amount of nitrogen presented to the filter units 62 and 63 can be controlled.

After the nitrogen leaves the warm end of the cold exchanger path 86, the nitrogen passes through a line 93, a check valve 95 or 96 then through one of the paths 23 or 24 of the warm reversing heat exchanger 20. In passing through path 23 or 24 of the warm reversing exchanger, the returning nitrogen vaporizes and removes the water deposited by the incoming gas mixture prior to reversal.

The nitrogen leaves path 23 or 24 through a shut-off valve 98 or 99 and thence out through a line 100.

Referring again to condenser 65, the filtered gas mixture leaves the filter units 62 or 63 through a check valve 102 or 103 and then passes through a line 105 to the lower portion of condenser 65. A fraction of the gas mixture is liquified in condenser 65 by heat transfer with the colder nitrogen waste gas stream from the top of a fractionating column indicated generally at 106, with a line 107 connecting the upper end of the fractionating column with the condenser. The liquified fraction from the condenser passes through a line 109 and is expanded through expansion valve 113 into the low pressure side of fractionating column 106. The remaining gaseous portion of the mixture leaves condenser 65 through a line 110, and enters the high pressure side of the fractionating column 106 where it is liquified by heat exchange with liquid at the low pressure side of the column. This liquified portion is then passed through line 112 and expanded through expansion valve 114 to the low pressure side of the fractionating column for more reflux.

In summary, the present invention provides a novel high pressure process whereby substantially all the water is removed from a gas mixture in passing through a single heat exchange zone, with such heat exchange zone further serving to condition the gas mixture for high pressure expansion. Moreover, according to the present process, the heat exchange zone is maintained free of plugging hazards. As another aspect, the present invention provides a novel method for filtering impurities from a gas mixture which effects automatic purging of the filter system without loss of refrigeration from the filter system to the atmosphere.

While the form of embodiment of the present invention as herein disclosed constitutes a preferred form, it is to be understood that other forms might be adopted, all coming within the scope of the claims which follow:

I claim:

1. A method for the separation of a gas mixture into its components wherein a gaseous stream of said mixture, the components of which differ in boiling points in their liquid states, is passed in one direction of flow through a heat exchange means including a warmer heat exchange zone and a cooler heat exchange zone, said warmer heat exchange zone including a first path progressively decreasing in temperature from end to end to effect cooling of the stream and resultant precipitation of a component of higher boiling point in said first path, and wherein a second gaseous stream free of the last mentioned component is passed subsequently through said same first path in said warmer heat exchange zone in the opposite direction of flow after the first stream has ceased flow through said first path, which method comprises: compressing said first mentioned stream prior to passage through said first path to effect removal of substantially all of said component; passing said first mentioned stream after passage through said first path through a second path in said warmer heat exchange zone in the same direction of flow as said second mentioned stream thereby effecting warming of said first mentioned stream; compressing said first mentioned stream after passage through said second path; and passing at least a portion of said first mentioned stream, after compression thereof, through said warmer heat exchange zone in heat exchange relationship with said second mentioned stream to effect cooling of said portion of said first mentioned stream; and passing at least a portion of said first mentioned stream through said colder heat exchange zone in heat exchange relationship with said second stream.

2. A method for the separation of a gas mixture into its components wherein a gaseous stream of said mixture, the components of which differ in boiling points in their liquid states, is passed in one direction of flow through a heat exchange means including a warmer heat exchange zone and a colder heat exchange zone, said warmer heat exchange zone including a first path progressively decreasing in temperature from end to end to effect cooling of the stream and resultant precipitation of a component of higher boiling point in said first path, and wherein a second gaseous stream free of the last mentioned component is passed subsequently through said same first path in said warmer heat exchange zone in the opposite direction of flow after the first stream has ceased flow through said first path, which method comprises: compressing said first mentioned stream prior to passage through said first path to effect removal of substantially all of said component; passing said first mentioned stream after passage through said first path in said warmer heat exchange zone through a second path in said warmer heat exchange zone in the same direction of flow as said second mentioned stream thereby effecting warming of said first mentioned stream; compressing said first mentioned stream after passage through said second path; passing at least a portion of said first mentioned stream; after compression thereof, through a third path in said warmer heat exchange zone in the opposite direction of flow to the second mentioned stream to effect cooling of said portion by counter current heat exchange with the second mentioned stream; and passing at least a portion of said first mentioned stream through said colder heat exchange zone in heat exchange relationship with said second stream.

3. A method for the elimination of higher boiling point impurities in the separation of a gaseous mixture by liquefaction and rectification, which method comprises: partially expanding a cooled stream of a gaseous mixture; passing said cooled and partially expanded gaseous mixture through one of a plurality of reversing regenerative separation units in which said higher boiling point impurities are separated from said gaseous mixture and deposited in said separation unit; passing a second gaseous stream free of said impurities and at a higher temperature than said gaseous mixture subsequently through the same separation unit in the opposite direction of flow after the first mentioned stream has ceased flow; and passing said second mentioned stream in heat exchange relationship with said gaseous mixture before said partial expansion.

4. A method for the elimination of higher boiling point impurities in the separation of a gaseous mixture by liquefaction and rectification, which method comprises: partially expanding a cooled stream of a gaseous mixture; passing said cooled and partially expanded gaseous mixture through one of a plurality of reversing filter units in which said higher boiling point impuriites are separated from said gaseous mixture and deposited in said filter unit; passing a second gaseous stream free of said impurities and at a higher temperature than said gaseous mixture subsequently through the same filter unit in the opposite direction of flow after the first mentioned stream has ceased flow, and passing said second mentioned stream in heat exchange relationship with said gaseous mixture before said partial expansion.

5. A method for the separation of a gas mixture into its components which method comprises: passing a gaseous stream of said mixture through a first path in a heat exchange means, said heat exchange means including a warmer portion and a colder portion; passing a second gaseous stream free of said components subsequently through said first path after said first stream has ceased to flow through said path; passing said first mentioned stream through a second path in said heat exchange means in the same direction of flow as said second mentioned stream thereby effecting warming of said first stream; compressing said first mentioned stream after passage through said second path; passing at least a portion of said first mentioned stream, after compression thereof, through a third path in said heat exchange means in heat exchange relationship with said second stream; passing said first mentioned stream through one of a plurality of reversing regenerative separation units; and passing at least a portion of said second mentioned stream through said one separation unit after said first mentioned stream has ceased to flow therein and prior to passage of said second mentioned stream through said warmer heat exchange portion.

6. A method for the separation of a gas mixture into its components which method comprises: passing a gaseous stream of said mixture through a first path in a heat exchange means, said heat exchange means including a warmer portion and a colder portion; passing a second gaseous stream free of said components subsequently through said first path after said first stream has ceased to flow through said path; passing said first mentioned stream through a second path in said heat exchange means in the same direction of flow as said second mentioned stream thereby effecting warming of said first stream; compressing said first mentioned stream after passage through said second path; passing at least a portion of said first mentioned stream, after compression thereof, through a third path in said heat exchange means in heat exchange relationship with said second stream; passing said first mentioned stream through one of a plurality of reversing regenerative separation units; passing at least a portion of said second mentioned stream in heat exchange relationship with at least a portion of said first mentioned stream in said colder heat exchange portion; diverting at least a portion of said second mentioned stream from said colder heat exchange portion; passing said diverted portion of said second mentioned stream through said one separation unit after said first mentioned stream has ceased to flow therein; and returning said diverted portion of said second mentioned stream to heat exchange relationship with said first mentioned stream.

7. A method for the separation of a gas mixture into its components which method comprises: passing a gaseous stream of said mixture through a first path in a heat exchange means, said heat exchange means including a warmer portion and a colder portion; passing a second gaseous stream free of said components subsequently through said first path after said first stream has ceased to flow through said path; passing said first mentioned stream through a second path in said heat exchange means in the same direction of flow as said second mentioned stream thereby effecting warming of said first stream; compressing said first mentioned stream after passage through said second path; passing at least a portion of said first mentioned stream, after compression thereof, through a third path in said heat exchange means in heat exchange relationship with said second stream; passing said first mentioned stream through one of a plurality of reversing regenerative separation units; passing at least a portion of said second mentioned stream in heat exchange relationship with at least a portion of said first mentioned stream in said colder heat exchange portion; diverting at least a portion of said second mentioned stream from said colder heat exchange portion; passing said diverted portion of said second mentioned stream through said one separation unit after said first mentioned stream has ceased to flow therein; returning said diverted portion of second mentioned stream to heat exchange relationship with said first mentioned stream and by-passing flow from said diverted portion of said second stream to said returned portion of said second stream to control the flow of said second stream to said separation units.

8. A method for the separation of a gas mixture into its components which method comprises: passing a gaseous stream of said mixture through a first path in a heat exchange means, said heat exchange means including a warmer portion and a colder portion; passing a second gaseous stream free of said components subsequently through said first path after said first stream has ceased to flow through said path; passing said first mentioned stream through a second path in said heat exchange means in the same direction of flow as said second mentioned stream thereby effecting warming of said first stream; compressing said first mentioned stream after passage through said second path; passing at least a portion of said first mentioned stream, after compression thereof, through a third path in said heat exchange means in heat exchange relationship with said second stream; passing at least a portion of said first mentioned stream through filter means subsequent to passage thereof through said heat exchange means; and passing at least a portion of said second mentioned stream through said filter means after said first stream has ceased to flow therein and prior to passage thereof through said warmer portion of said heat exchange means.

9. A method for the separation of a gas mixture into its components which method comprises: passing a gaseous stream of said mixture through a first path in a heat exchange means, said heat exchange means including a warmer portion and a colder portion; passing a second gaseous stream free of said components subsequently through said first path after said first stream has ceased to flow through said path; passing said first mentioned stream through a second path in said heat exchange means in the same direction of flow as said second mentioned stream thereby effecting warming of said first stream, compressing said first mentioned stream after passage through said second path; passing at least a portion of said first mentioned stream, after compression thereof, through a third path in said heat exchange means in heat exchange relationship with said second stream; expanding at least a portion of said first mentioned stream after passage thereof through said heat exchange means; passing at least a portion of said first mentioned stream through filter means subsequent to said expansion thereof; and passing at least a portion of said second mentioned stream through said filter means after said first stream has ceased to flow therein and prior to passage thereof through said warmer portion of said heat exchange means.

10. A method for the elimination of higher boiling point impurities in the separation of a gaseous mixture by liquefaction and rectification: which method comprises; partially expanding a cooled gaseous mixture; passing said gaseous mixture after said partial expansion through one of a plurality of reversing regenerative separation units in which the higher boiling point impurities are separated from said gaseous mixture and deposited in said separation unit; passing a second gaseous stream free of said impurities in heat exchange with said gaseous mixture prior to said partial expansion; and passing said second gaseous stream through said one separation unit in the opposite direction of flow after said gaseous mixture has ceased to flow.

11. A method for the elimination of higher boiling point impurities in the separation of a gaseous mixture by liquefaction and rectification: which method comprises; partially expanding a cooled stream of a gaseous mixture; passing said cooled and partially expanded gaseous mixture through one of a plurality of reversing regenerative separation units in which said higher boiling point impurities are separated from said gaseous mixture and deposited in said separation unit; passing a second gaseous stream free of said impurities in heat exchange with said gaseous mixture prior to passage of said gaseous mixture through said separation units; partially expanding a cooled gaseous mixture; passing said gaseous mixture after said partial expansion through one of a plurality of reversing regenerative separation units in which the higher boiling point impurities are separated from said gaseous mixture and deposited in said separation unit; passing a second gaseous stream free of said impurities in heat exchange with said gaseous mixture prior to said partial expansion; passing said second gaseous stream through said one separation unit in the opposite direction of flow after said gaseous mixture has ceased to flow; and passing said second gaseous stream in heat exchange with said gaseous mixture before said partial expansion of said gaseous mixture.

12. A method for the separation of a gas mixture into its components wherein a gaseous stream of said mixture, the components of which differ in boiling points in their liquid states, is passed in one direction of flow through a heat exchange means including a warmer heat exchanger and a colder heat exchanger, said warmer heat exchanger including a first path having two branches and progressively decreasing in temperature from end to end to effect cooling of the stream and resultant precipitation of a component of higher boiling point in said first path, and wherein a second gaseous stream free of the last-mentioned component is alternately passed through the branches of said same first path in said warmer heat exchanger in the opposite direction of flow after the first stream has ceased flow through alternate branches of said first path, which method comprises: passing the first-mentioned stream through said first path in said warmer heat exchanger; passing said first-mentioned stream through a second path in said warmer heat exchanger in the same direction of flow as the second-mentioned stream, thereby effecting warming of said first stream; passing a third highly compressed stream of said mixture through a third path in said warmer heat exchanger in the opposite direction of flow to the second-mentioned stream to effect cooling of said third stream by counter current heat exchange with the second-mentioned stream; passing a downstream portion of said third stream through said colder heat exchanger in heat exchange relationship with said second stream; and alternating the flow of said first and second streams through the branches of the first path in said warmer heat exchanger while maintaining the paths of flow in said colder heat exchanger.

13. In the separation of a gas mixture into its components, the method comprising: routing a gas mixture to and through alternate ones of a pair of reversing filter units, said gas mixture giving up refrigeration to alternate ones of said filter units; passing a component of separation through alternate ones of said filter units for removing impurities disposed in said filter units by said mixture after said mixture has ceased to flow, said filter units alternately giving up refrigeration to said component of separation; and passing said component of separation, after passage through alternate ones of said filter units, in continuous heat exchange relationship with at least a portion of said mixture prior to routing of said mixture to said filter units, whereby said component of separation continuously gives up refrigeration obtained from said filter units to said mixture and said mixture alternately returns refrigeration back to said filter units.

References Cited in the file of this patent

UNITED STATES PATENTS

| 2,667,043 | Collins | Jan. 26, 1954 |
| 2,669,047 | Karwat et al. | Jan. 11, 1955 |
| 2,763,138 | Tsunoda | Sept. 18, 1956 |